United States Patent [19]

Stofko

[11] 4,107,379

[45] Aug. 15, 1978

[54] BONDING OF SOLID LIGNOCELLULOSIC MATERIAL

[75] Inventor: John Stofko, 5079 Kearney, Oakland, Calif. 95602

[73] Assignees: John Stofko, St. Charles, Ill.; John Jansky, Paris, France

[21] Appl. No.: 767,261

[22] Filed: Feb. 10, 1977

Related U.S. Application Data

[63] Continuation of Ser. No. 549,663, Feb. 13, 1975, abandoned.

[30] Foreign Application Priority Data

Feb. 22, 1974 [GB] United Kingdom ................ 8084/74
May 8, 1974 [GB] United Kingdom ............. 20227/74

[51] Int. Cl.$^2$ ............................................. B32B 5/16
[52] U.S. Cl. ................................. 428/326; 106/162; 106/203; 106/163 R; 106/213; 156/62.2; 156/336; 264/109; 264/128; 427/299; 427/415; 428/403; 428/535; 428/420; 428/537

[58] Field of Search ............... 156/336, 316, 62.2, 156/318, 87, 319, 310, 322, 313, 307; 428/326, 420, 342, 541, 403, 532–537; 106/162, 203, 163 R, 213; 264/109, 128; 427/399, 415; 536/1

[56] References Cited

U.S. PATENT DOCUMENTS

| 2,204,384 | 6/1940 | Salisbury | 106/162 |
|---|---|---|---|
| 2,495,043 | 1/1950 | Willey et al. | 428/420 |
| 2,557,071 | 6/1951 | Boehm | 156/307 |
| 2,639,994 | 5/1953 | Wilson | 106/163 R |
| 3,565,651 | 2/1971 | Waggle | 106/213 |

FOREIGN PATENT DOCUMENTS

1,264,930 2/1972 United Kingdom.

*Primary Examiner*—William A. Powell
*Assistant Examiner*—J. J. Gallagher
*Attorney, Agent, or Firm*—Karl W. Flocks

[57] ABSTRACT

Solid lignocellulosic material is bonded together by heating and pressing with a bonding composition comprising at least one carbohydrate and an acid capable of catalysing hydrolysis of the carbohydrate, for example to make plywood or particle board.

21 Claims, No Drawings

BONDING OF SOLID LIGNOCELLULOSIC MATERIAL

This is a continuation, of application Ser. No. 549,663, filed Feb. 13, 1975, now abandoned.

This invention relates to the bonding together of solid lignocellulosic materials, particularly of wood.

Bonding of lignocellulosic materials, such as wood, is widely used commercially, such as in the manufacture of plywood or particle boards. In present commercial bonding procedures, adhesives, such as ureaor phenol formaldehyde are employed, which are spread or otherwise applied to the surface of the material, and penetrate the wood structure whereby bonding is effected by the adhesive. Procedures have been proposed to effect such bonding by chemical reactions between reagents and the wood itself, but have not met commercial acceptance.

According to one aspect of the present invention, there is provided a method of bonding solid lignocellulosic materials, which comprises applying a bonding composition comprising at least one carbohydrate and an acid capable of catalysing hydrolysis of the carbohydrate to a surface of the material and pressing surfaces of the material together at an elevated temperature.

The method of the invention may be used for manufacture of laminates, plywood and particle boards without the use of traditional adhesives.

It is believed that bonding is created by chemical transformation of the carbohydrates which are applied to the wood surface and carbohydrates present in a layer of wood surface.

It is well known that wood is a high polymeric substance of a complicated structure composed of three classes of compounds, namely carbohydrates, lignin and extractives. The main carbohydrate, cellulose, is a polysaccharide build up of glucose units. Lignin is a complicated phenolic compound the structure of which has not been entirely determined. Not much is known about the character of the bond between the carbohydrates and lignin, although, generally speaking, lignin seems to function as a binder of cellulose microfibrils. The function of extractives appears to be manifold, their disease protective function probably being the most important.

The chemical reactions involved in the bonding system in the present invention have not been fully elucidated. Theoretically, several reaction systems may be involved at the same time. The most important, however, appears to be hydrolytic degradation of polysaccharides and lignin by the action of the acid and repolymerization of degradation products thereof.

The action of acids on polysaccharides results in hydrolysis into the component monosaccharides, followed by further transformation of the resulting monosaccharides: thus xyloses are dehydrated to furfural, glucose and mannose to hydroxymethyl furfural. These furanes are extremely reactive and further transform into a large variety of chemical species, in the case of glucose, chiefly to levulinic acid, as well as to ill defined polymeric humins. Various mechanisms for polymerization reactions of hydrolysis products have been proposed to explain their formation.

The action of strong acids on lignin results in condensation of various types. In mild acidic media partial hydrolytic degradation of lignin into a variety of products takes place. Yields, however, are small because of concurrent polymerization of degradation products. In acidic media a coupling of degradation products of carbohydrate and lignin appears to be a theoretical possibility.

It is believed that all or some of the abovementioned reactions may be involved in the bonding process of the present invention.

It has been found that the strength of bonds formed between pieces of wood using the present invention is at least comparable to the strength of bonds achieved by hitherto used adhesives.

In the manufacture of plywood it is only necessary to cover a surface of a wood veneer with a liquid carrier containing the carbohydrate and acid, bring such surface into contact with the surface of another veneer which may or may not have a coating of the bonding composition, and press them at an elevated temperature in a conventional press.

Alternatively, the liquid composition containing the carbohydrate and acid may be cooked before application to the material to be bonded to transform carbohydrates into furane type intermediate products. Preferred cooking conditions are 100° to 130° C for from 30 to 90 minutes. The cooking results in colour change to brown or black indicating the level of chemical transformation of carbohydrates. The cooked composition can be applied to a wood surface in the same way as an uncooked one, followed by pressing under heat and pressure. Cooking may be advantageous in cases where shorter pressing times are required.

In some cases it may be advantageous to expose wood veneers or particles covered by the liquid bonding composition to an elevated temperature for a short period of time prior to pressing. Such preheating causes partial chemical transformation of carbohydrates which may shorten the pressing time or lower the pressing temperature required. Temperatures of preheating up to 140° C may be employed for a period of time up to about 15 minutes.

The bonding composition may include a liquid carrier which is non-reactant with the lignocellulosic material, such as water, ethyl alcohol and other solvents. In general the vapors from the carrier may readily escape from the press during the pressing. The composition may also contain other chemical reagents capable of affecting the bonding reaction, i.e. accelerating or reducing the extent of the reaction in which the carbohydrate participates depending upon the reaction conditions which may vary widely. Such reagents may be incorporated in the desired amount in the carrier liquid together with the carbohydrate and the acids. Mixtures of various carbohydrates as well as mixtures of various acids in a carrier may be employed.

Excess amounts of carbohydrates and acid catalyst applied to the surface of wood do not affect the efficiency of bonding but are uneconomical. It is merely necessary to have sufficient carbohydrate and acid to effect the bonding reaction in a press under heat and pressure. The minimum amount of carbohydrate and acid required is variable depending on the pH of the wood and carbohydrates, kind and reactivity of carbohydrate, temperature, moisture content of wood, desired reaction speed and other factors.

It is known that hydrolysis of polymeric carbohydrates, such as cellulose, hemicelluloses and starch into monomeric units is an unhomogenous process, because of different reaction rates of different carbohydrates. It can be assumed that also rates of transformation of simple sugars, such as glucose, xylose, sucrose into furane type compounds and their condensation are variable. Therefore, the rate of reaction may be varied between quite wide limits.

The optimum amount of carbohydrate used will vary depending upon the character of the wood, reactivity or other properties of the carbohydrate used, surface roughness of the wood and the pressing conditions desired. Only a film of the composition need be applied which can be conveniently done by brushing, spraying or roller spreading. Typically an amount of the bonding composition may be employed which will provide from 2 to 32 grams of carbohydrate per 1000 cm$^2$ of area.

For example when wood laminates are prepared with Douglas fir veneers and a mixture of sucrose and starch in the ratio 1:1 as a carbohydrate, sulfuric acid as a catalyst in water as the carrier and pressing conditions of 12 kg/cm$^2$ and temperature of 160° C for 7 minutes, an amount of carbohydrate of about 5 grams per square foot will suffice. The minimum amount of carbohydrate under these conditions may be 2.5 grams per square foot. The preferred amount of sulfuric acid as a catalyst in this case would be about 1 to 2% of the amount of carbohydrate.

From the preceding, it will be seen that a wide variety of carbohydrates may be employed, including cellulose, hemicelluloses, sugars such as glucose and sucrose, starch, wheat or corn flour, molasses of various origin and mixtures of carbohydrates. Inexpensive molasses represent an attractive possibility. The acids which may be used include sulphuric, hydrochloric, phosphoric and acetic acid.

The amount of acid present is generally from 1 to 20% by weight on the carbohydrate; the preferred ratio depends on the identity of carbohydrate and acid. It is preferred to keep the amount of acid used to the minimum level necessary to catalyze the carbohydrate transformation into the furane type compounds and their polymerization. A large excess of acid may be harmful to wood strength over a long period of time. The amount of hydrochloric acid, which is a strong acid, necessary to catalyze the transformation of the mixture of sucrose and starch in the ratio of 1:1 is about 1–2% of acid to carbohydrate by weight. The amount of weak acid, such as acetic of phosphoric required would be higher than that of hydrochloric acid. The transformation of polymeric carbohydrates, such as cellulose, into furane type compounds requires a higher proportion of acid than simpler carbohydrates, such as glucose or sucrose, for a given reaction rate.

In a preferred embodiment of the invention, a mixture of carbohydrates comprising sugars and starches, such as sucrose and wheat flour is used. For reasons which are not clear such mixtures produce a higher degree of bonding than simple carbohydrates, i.e. only sugars or only starches. It is advantageous to use sugars and starches of approximately the same decomposition rate. Simple carbohydrates are preferred to polymeric ones because of their higher decomposition rate. Price and availability, however, is probably the most important factor in deciding which raw material to use. Low boiling point acids are preferred to high boiling point acids because they are removed from wood during pressing operation, which substantially eliminates the possibility of the acid attacking the bonded lignocellulosic material over a long storage period.

Pressing conditions in the press will vary widely depending upon variables, such as kind of carbohydrate, kind of wood, kind and amount of catalyst and requirements on the product. As usual for any given system, the lower the temperature, the longer the pressing time and vice versa. The pressing temperature should not exceed the temperature at which charring of the lignocellulosic material will occur nor should the pressure exceed that at which the lignocellulosic material will undesirably crush. The preferred temperature range is 140° to 200° C and the preferred pressure range 5 to ≃kg/cm$^2$. The pressing time required under these conditions is generally 0.3 to 2 min. per mm of thickness.

The invention may be applied to any kind of wood bonding such as in plywood or particle board production, wood lamination and other composite board production. In the production of composite products such as particle boards, the same procedure is followed as for plywood manufacture except that the particles are thoroughly covered by the carrier containing carbohydrate and acid, which can be achieved by spraying and mixing followed by board formation and pressing in the press.

Embodiments of the invention will be described, by way of illustration, in the following Examples. Percentages are given by weight.

EXAMPLE I

Douglas fir veneers 130 cm square and 2.5 mm thick with moisture content of about 4% were brushed on one surface with water solution containing 25% of sucrose, 25% starch and 1% of sulphuric acid in the amount of about 10 grams of the solution per area of 30 cm square. After application of the solution a 3 ply plywood was made by hot pressing in a conventional press at the pressure of 12 kg/cm$^2$ and temperature of 170° C for 7 minutes. Shear strength tests on 20 specimens showed shear strength of 16 kg/cm$^2$ which was comparable to similar products used phenol formaldehyde adhesive. Shear strength in wet conditions after 4 hours boiling water followed by 20 hours drying at 53° C and again 4 hours boiling was about 8 kg/cm$^2$.

EXAMPLE II

The same procedure was used as in Example I, except that prior to pressing veneers covered with the same carrier solution were put into an oven at the temperature of about 140° C for 5 minutes, whereupon the veneer surfaces turned to a dark colour and the pressing time was reduced to 5 minutes. The strength properties were about the same as in Example I.

EXAMPLE III

A water solution containing 25% of sucrose, 25% of wheat flour and 1% of sulphuric acid was boiled until the colour turned dark, which took about 30 minutes. After cooling the solution was used for making Douglas fir plywood panels under the same conditions as in Example II. Strength properties were about the same as in the previous examples.

EXAMPLE IV

Douglas fir shavings having a moisture content of about 4% were sprayed with water solution containing 25% sucrose, 25% starch and 1% of sulphuric acid. The amount used was about 10% of the solution to the wood weight. A particle mat was formed from such sprayed shavings which was transferred into a hot press with press platen at temperature of 170° C and particle board pressed for 7 minutes. After cooling to room temperature internal bond tests were performed which showed internal bond value of about 5 kg/cm² which is above the requirements of the standards. The bond was resistant to 4 hours boiling.

From the review of these examples, it is apparent that the addition of small amount of carbohydrate and acid to the surfaces to be bonded leads to bond formation under heat and pressure. The strength of the bond is comparable to the strength achieved by traditional adhesives and the bonds are resistant to water. The economical advantage of such system is great because the amount of carbohydrate used represents only about ⅓ of the amount of adhesive for the same conditions; and the price of some carbohydrate applicable in this bonding system, such as molasses, represent only about ⅓ to 1/5 of the price of the most extensively used adhesives such as urea or phenol formaldehyde adhesives.

I claim:

1. A method of providing a waterproof bond between solid lignocellulose materials, comprising:
  applying to the surface of said solid lignocellulose material an amount sufficient to effect bonding comprising in the range of from 2 to 32 grams of carbohydrate per 1,000 cm² of area of material of a bonding composition comprising a non-cellulosic carbohydrate and an acid catalyst capable of catalyzing transformation of the carbohydrate, the amount of acid catalyst being from 1 to 20% by weight of the carbohydrate; and
  pressing said solid lignocellulose materials together at about 140°–200° C at a pressure in the range of about 5–25 kg/cm² for about 0.32 to 2 minutes per mm of thickness of said solid lignocellulose materials to transform said carbohydrate into furan type compounds and form said waterproof bond.

2. A method of bonding solid lignocellulosic materials producing a waterproof bond, which comprises
  applying to the surface of the material a bonding composition consisting essentially of a non-cellulosic carbohydrate and an acid catalyst capable of catalyzing transformation of the carbohydrate, said carbohydrate being present in an amount sufficient to coat the surface of said material, and said catalyst being present in an amount sufficient to catalyze transformation of said carbohydrate to produce a waterproof bond, and
  pressing surfaces of the material together at an elevated temperature and for a time sufficient to effect bonding by transformation of the carbohydrate, and wherein the time, temperature and pressure are sufficient to produce a waterproof bond.

3. A method according to claim 1, in which the carbohydrate is selected from a hemicellulose, sugars and starches.

4. A method according to claim 3, in which the carbohydrate is selected from sucrose, glucose, and starch obtained from wheat or corn flour.

5. A method according to claim 1, in which the bonding composition contains at least one sugar and at least one starch.

6. A method according to claim 5, in which the bonding composition contains substantially equal weights of sugar and starch.

7. A method according to claim 1, in which the acid is selected from sulphuric, hydrochloric, phosphoric and acetic acids.

8. A method according to claim 1, in which the amount of acid present is from 1 to 20% by weight of the amount of carbohydrate in the bonding composition.

9. A method according to claim 1, in which the bonding composition contains a liquid carrier which does not react with lignocellulosic material.

10. A method according to claim 9, in which the liquid carrier is selected from water and ethanol.

11. A method according to claim 1, in which the bonding composition is applied to the surface in an amount to give from 2 to 32 grams of carbohydrate per 1000 cm² of surface.

12. A method according to claim 1, in which the surfaces are pressed together at a temperature from 140° to 200° C and a pressure from 5 to 25 kg/cm².

13. A method according to claim 1, in which the bonding composition is heated before application to the surface.

14. A method according to claim 13, in which the bonding composition is heated at a temperature from 100° to 130° for a period from 30 to 90 minutes to change the color of the bonding composition to brown or black.

15. A method according to claim 1, in which the lignocellulosic material is heated after application of the bonding composition and before pressing.

16. A method according to claim 15, in which the lignocellulosic material is heated at a temperature not exceeding 140° C for a period up to 15 minutes.

17. A method according to claim 1, in which the lignocellulosic material comprises wood veneers which are laminated together during the pressing.

18. A method according to claim 17, in which the bonding composition is applied to one only of the respective veneer surfaces which are pressed together.

19. A method according to claim 1, in which the lignocellulosic material comprises particles of wood.

20. Solid lignocellulosic material, bonded together with a waterproof bond by pressing at an elevated temperature with a bonding composition comprising at least one non-cellulosic carbohydrate and an acid capable of catalysing hydrolysis of the carbohydrate.

21. Plywood and particle board, bonded together with a waterproof bond by pressing at an elevated temperature with a bonding composition comprising at least one non-cellulosic carbohydrate an an acid capable of catalysing hydrolysis of the carbohydrate.

* * * * *